(12) United States Patent
Sutherland

(10) Patent No.: US 11,677,264 B2
(45) Date of Patent: Jun. 13, 2023

(54) SYSTEM AND METHOD FOR A BACKUP POWER SUPPLY

(71) Applicant: Electronic Power Design, Inc., Houston, TX (US)

(72) Inventor: Charles Sutherland, Houston, TX (US)

(73) Assignee: ELECTRONIC POWER DESIGN, INC., Houston, TX (US)

( * ) Notice: Subject to any disclaimer, the term of this patent is extended or adjusted under 35 U.S.C. 154(b) by 0 days.

(21) Appl. No.: 17/093,260

(22) Filed: Nov. 9, 2020

(65) Prior Publication Data

US 2022/0149652 A1  May 12, 2022

(51) Int. Cl.
*H02J 9/06* (2006.01)
*H02J 7/00* (2006.01)
*H02M 5/458* (2006.01)

(52) U.S. Cl.
CPC ............. *H02J 9/062* (2013.01); *H02J 7/007* (2013.01); *H02M 5/4585* (2013.01)

(58) Field of Classification Search
CPC ......... H02J 9/062; H02J 7/007; H02M 5/4585
USPC ........................................................ 307/66
See application file for complete search history.

(56) References Cited

U.S. PATENT DOCUMENTS

| | | | |
|---|---|---|---|
| 3,818,275 A * | 6/1974 | Shimp | H02H 1/063 361/100 |
| 5,642,275 A | 6/1997 | Peng et al. | |
| 6,101,113 A | 8/2000 | Paice | |
| 6,118,678 A | 9/2000 | Limpaecher et al. | |
| 7,439,634 B2 | 10/2008 | Michalko | |
| 8,644,037 B2 | 2/2014 | Raju et al. | |
| 8,738,191 B2 | 5/2014 | Aivaliotis et al. | |
| 9,257,864 B2 | 2/2016 | Pahlevaninezhad et al. | |
| 9,331,561 B2 | 5/2016 | Kolar et al. | |
| 9,602,021 B2 | 3/2017 | Chaudhuri et al. | |
| 10,230,254 B1 * | 3/2019 | Najmabadi | H02P 27/06 |
| 10,381,832 B2 | 8/2019 | Sato et al. | |
| 2006/0138867 A1 | 6/2006 | Tian et al. | |
| 2010/0237808 A1 | 9/2010 | Kwon et al. | |
| 2011/0016055 A1 | 1/2011 | Mazzarella | |
| 2011/0089873 A1 * | 4/2011 | Blocher | H02M 7/483 318/400.3 |
| 2012/0059555 A1 * | 3/2012 | Bixel | B66C 13/22 701/50 |
| 2018/0198291 A1 * | 7/2018 | Kuo | H02J 7/0014 |
| 2018/0274122 A1 | 9/2018 | Guskov et al. | |
| 2020/0189404 A1 * | 6/2020 | Haugan | B60L 53/50 |

FOREIGN PATENT DOCUMENTS

| | | |
|---|---|---|
| CN | 203135731 U | 8/2013 |
| CN | 104242447 A | 12/2014 |

\* cited by examiner

*Primary Examiner* — Richard Tan
(74) *Attorney, Agent, or Firm* — G. Michael Roebuck

(57) ABSTRACT

A system and method for providing a backup power supply.

8 Claims, 4 Drawing Sheets

SYSTEM AND METHOD FOR A BACKUP POWER SUPPLY

CROSS REFERENCE TO RELATED PATENT APPLICATIONS

The patent application claims priority from U.S. Provisional Patent application No. 62/931,989 filed on Nov. 7, 2019 by Sutherland and entitled "a System and Method for a Backup Power Supply", which is hereby incorporated by reference in its entirety.

BACKGROUND OF THE INVENTION

There is a need for clean back up power supply.

FIELD OF THE INVENTION

The invention relates to the field of clean backup power supplies.

SUMMARY OF THE INVENTION

A back up power supply for providing clean power using a battery and a diode rectifier is disclosed.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions.

DETAILED DESCRIPTION OF AN ILLUSTRATIVE EMBODIMENT OF THE INVENTION

Figure 1A:
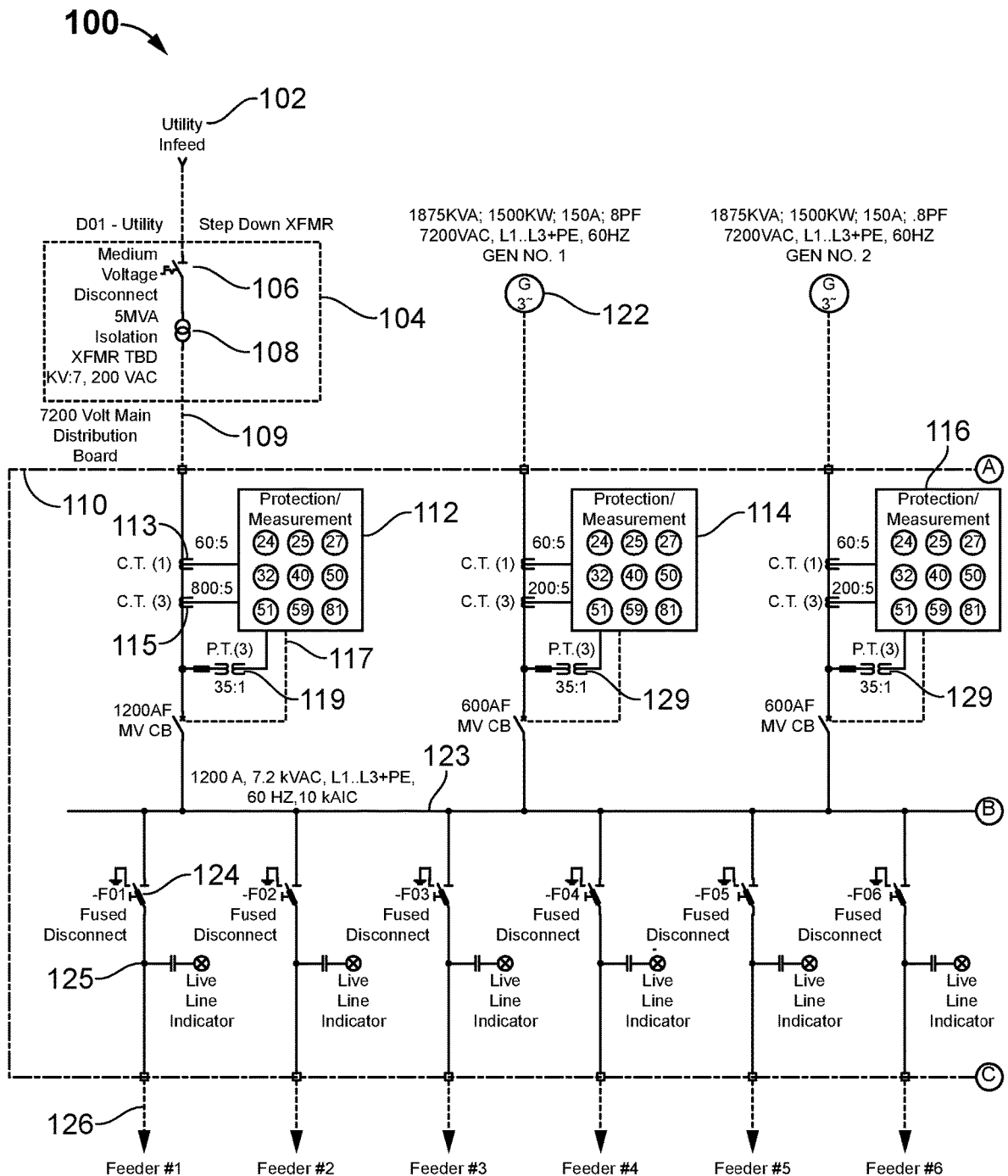
FIG. 1A through FIG. 1C are schematic depictions of an illustrative embodiment of the invention.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural detail, nor do they limit the scope of the claims.

Figure 1B:
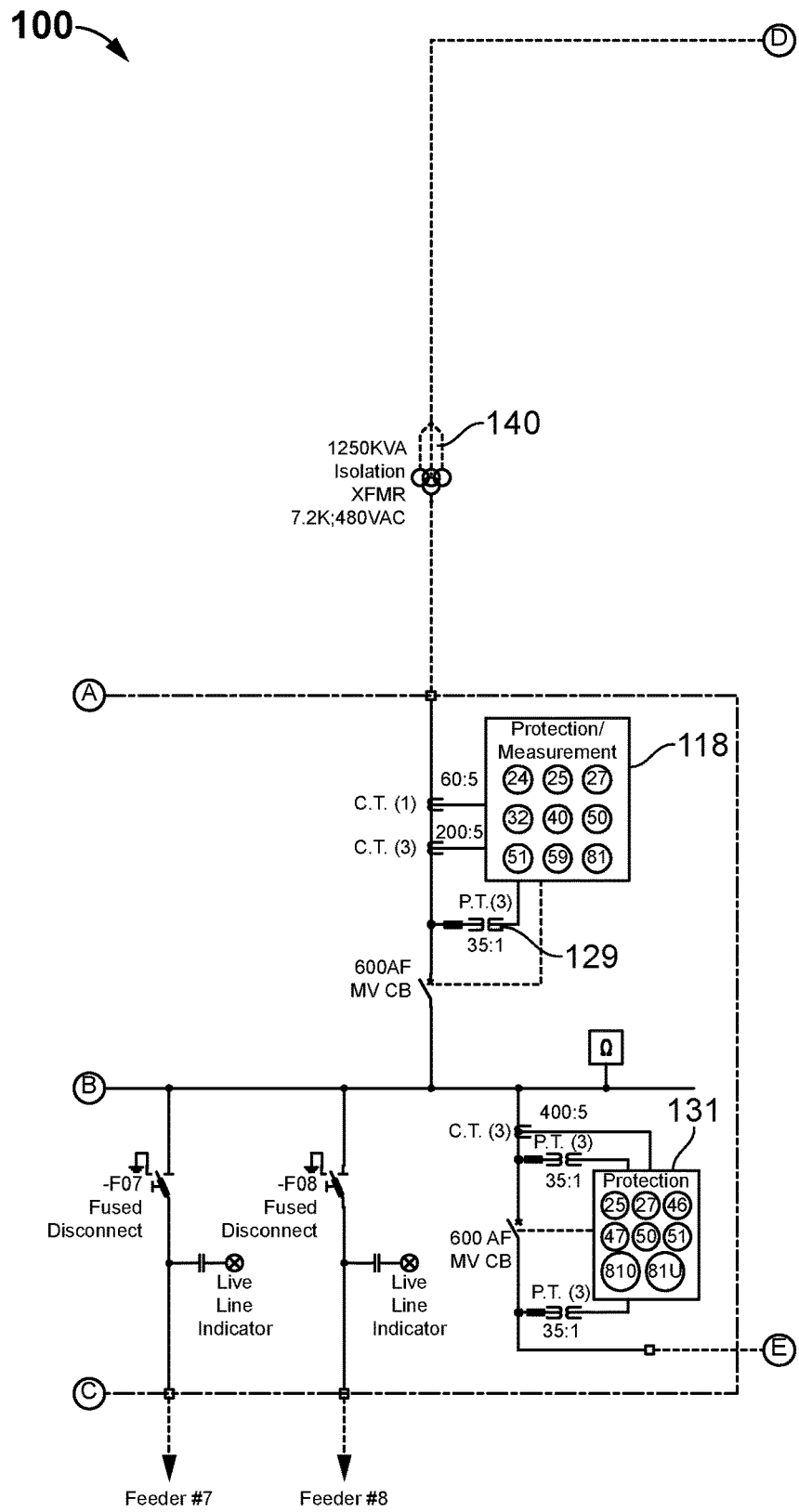
Figure 1C:
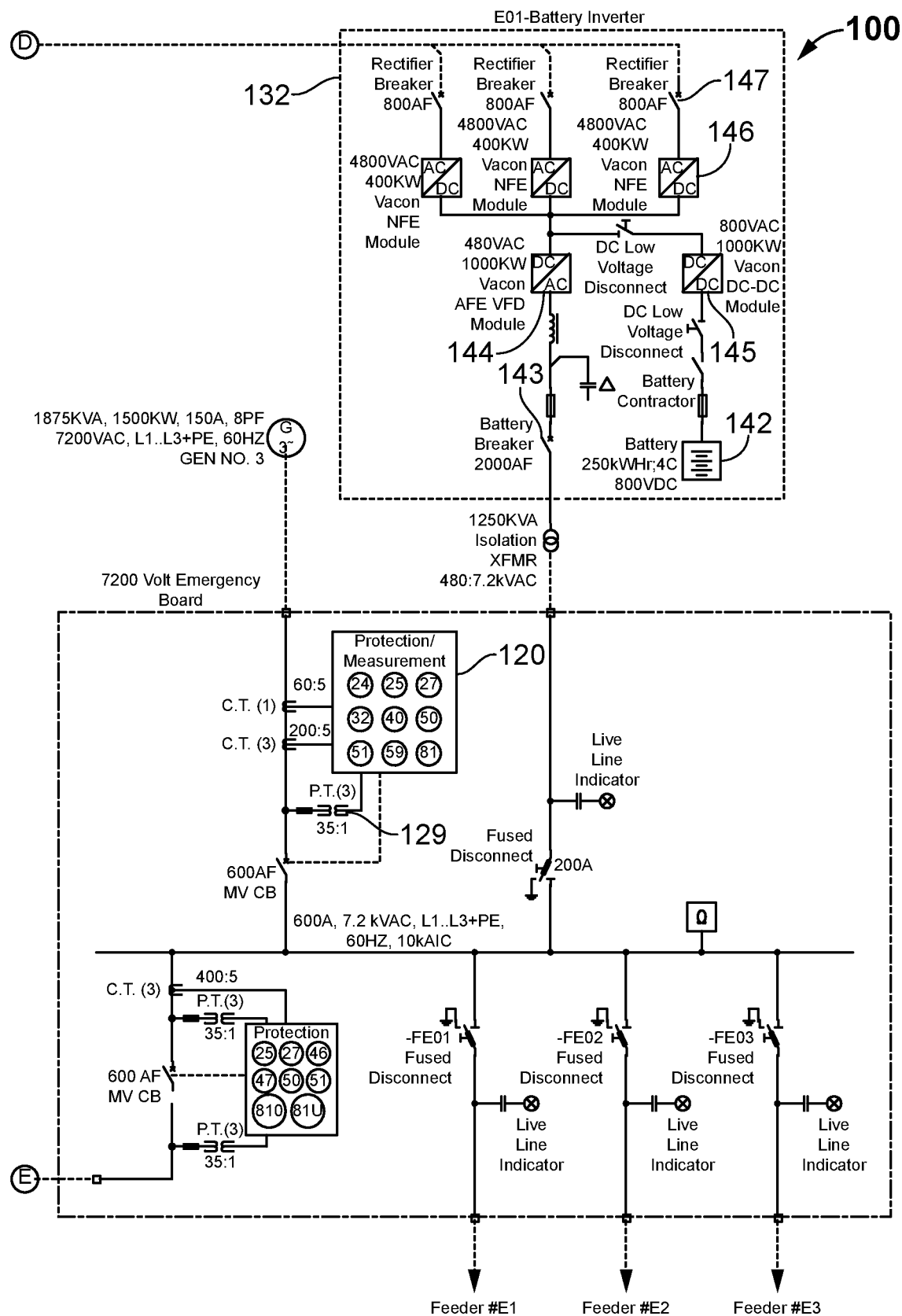

As shown in FIG. 1A-1C, in a particular illustrative embodiment of the invention a system and method use raw AC power from the utility to feed an 18 pulse diode rectifier. By being 18 pulse, this load should not add additional harmful distortion to the already weak AC Utility Grid Bus. Then, the system and method take this DC Bus, created from the diode bridges, to feed an inverter to supply a Clean AC Bus. The DC Bus is connected to a DC-to-DC converter to a large Utility scale battery to ensure the synthetic AC Clean Bus has some kW as well as kVAR to fill in for voltage sags [[says]] and brown-outs. This circuit is different than most known uses because the system and method are intentionally NOT trying to clean the main utility AC Bus. (The system and method are not trying to fix the whole grid, just our AC Bus that we will use for our customers that require clean power that is otherwise not available.). In an alternative embodiment of the invention an Engine-Generator would also work but it is expensive, has lots of unwanted smoke and noise.

In a particular illustrative embodiment of the invention, a system and method are disclosed that includes but is not limited to a power conversation equipment. In a particular illustrative embodiment the system and method creates a clean power output with minimal fluctuations in voltage and frequency while producing a clean power bus, the conversion equipment consumes the raw utility power and prevents the expensive "clean energy" from being consumed on the grid side due to its low impedance. In a particular illustrative embodiment, the system and method maintains a harmonic output voltage distortion to levels below industry standards and utilizes energy storage for the purpose of ride through and/or long term backup. In another particular illustrative embodiment of the invention, high availability is achieved with the inclusion of a bypass mechanism in the event of equipment failure. In another particular illustrative embodiment of the invention, harmonic mitigating rectifiers on the input power section ensure distortion at the utility coupling are below industry standard levels.

Turning now to FIG. 1A-1C, as shown in FIG. 1A-1C, the system uses phase shifting transformers in order to feed a multi-pulse diode/thyristor front end. Depending on the size of the converter and the utility feed, the front end will be 6 pulse or greater. The rectifier will create a DC link that one or more inverters will be connected. The purpose of the inverters is to create a constant voltage and frequency output regardless of the utility input. Depending on the required ride through time, batteries and/or capacitors are connected to the DC bus. The battery will utilize a DC-DC converter in order to match the battery voltage to the DC link voltage.

As shown in FIG. 1A-1C, in a particular illustrative embodiment of the invention, system 100 is schematically depicted. As shown in FIG. 1A-1C, a utility in feed 102 feeds into a utility stepdown transformer 104. A medium voltage disconnect 106 is provided. An isolation transformer 108 is provided. A 720 VAC line 109 feeds into the 7200 volt main distribution board 110. Protection measurement modules 112, 114, 116, 120 and 122 are provided.

A 1200 ampere 7.2 KVAC 124, phased disconnect 124, live line indicator 125 and feeder 126 are provided. A 1200 AF MV circuit breaker 119 is provided. A protection module 131 is provided. A battery inverter 132 is provided along with an isolation transformer 140.

A battery 142 and a battery breaker 143 are provided. A 480 VAC 1000 KW VACON TRADEMARK active front end (AFE) variable frequency drive (VFD) module 144 and 145 are provided. A 480 VAC 400KW VACON TRADEMARK non regenerative front end (NFE) Module 146 is provided. A rectifier breaker 147 is provided.

Figure 2:
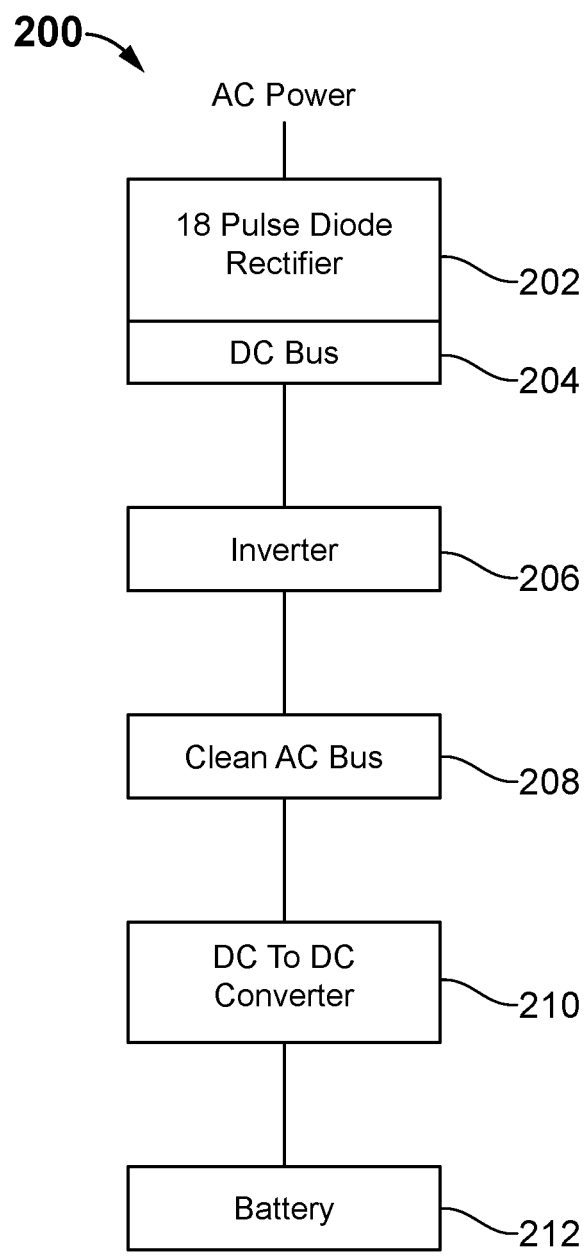
FIG. 2 is schematic depiction of an illustrative embodiment of the invention.

Turning now to FIG. 2, in a particular illustrative embodiment, alternating current from a utility is fed to an 18-pulse diode rectifier 202. A DC bus 204 formed by the diodes on the 18-pulse diode rectifier is fed to an inverter 206. The inverter feeds alternating current generated by the inverter 206 is fed to a clean alternating current bus 208. The clean alternating current power bus feeds clean AC power to a direct current to direct current converter that is fed to a battery 212.

In a particular illustrative embodiment of the invention, a backup power supply is disclosed, including but not limited to an unfiltered alternating current power supplied from a utility; an 18-pulse diode rectifier connected to the unfiltered alternating current power; a direct current bus formed on the diodes of the 18-pulse diode rectifier; an inverter connected to the direct current bus; a filtered (also referred to herein as "clean") alternating current bus attached to an output of the inverter; an alternating current to direct current converter connected to the output of clean alternating current bus; and a battery connected to the output of the alternating current to direct current that charges the battery.

In a particular illustrative embodiment of the invention, in the system the inverters create a constant voltage and frequency output regardless of the utility input.

In a particular illustrative embodiment of the invention, in the system depending on the required ride through time, batteries and/or capacitors are connected to the DC bus. In electrical power engineering, fault ride through (FRT), sometimes under-voltage ride through (UVRT), or low voltage ride through (LVRT) is the capability of electric generators to stay connected in short periods of lower electric network voltage (cf. voltage sag). It is needed at distribution level (wind parks, PV systems, distributed cogeneration, etc.) to prevent a short circuit at HV or EHV level from causing a widespread loss of generation. Similar requirements for critical loads such as computer systems and industrial processes are often handled through the use of an uninterruptible power supply (UPS) or capacitor bank to supply make-up power during these events.

In a particular illustrative embodiment of the invention, in the system wherein the battery will utilize a DC-DC converter in order to match the battery voltage to the DC link voltage In a particular illustrative embodiment of the invention, a method for suppling back up power, is disclosed, the method including but limited to providing an unfiltered alternating current power supplied from a utility to an 18-pulse diode rectifier connected to the alternating current power; proving a clean alternating current power from a direct current bus formed on the diodes of the 18-pulse diode rectifier to an inverter connected to the direct current bus; providing a clean alternating current clean alternating current bus attached to an output of the inverter to a direct current to direct current converter connected to the output of clean alternating current bus; and providing the direct current from the direct current to a direct current power supply to a battery connected to the output of the direct current to direct current that charges the battery, wherein the battery acts as a backup power supply.

In a particular illustrative embodiment of the invention, in the method the inverters create a constant voltage and frequency output regardless of the utility input. In a particular illustrative embodiment of the invention, in the method, depending on the required ride through time, batteries and/or capacitors are connected to the DC bus. In a particular illustrative embodiment of the invention, in the method the battery will utilize a DC-DC converter in order to match the battery voltage to the DC link voltage.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology.

Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that issues therefrom. In a particular illustrative embodiment of the invention a novel system and method are disclosed that provide a unique application in the marketplace with batteries being used specifically on a very poor quality utility AC Bus.

The invention claimed is:

1. A back up power supply, comprising:
an unfiltered alternating current supplied from a utility;
a current transformer connected to receive the unfiltered alternating current supplied from the utility;
a medium voltage disconnect positioned between the utility and the current transformer;
a protection and monitoring circuit attached to the current transformer that indicates power is present;
a fused disconnect attached to an output of the protection and monitoring circuit;
a live line indicator attached to an output of the fused disconnect;
a circuit breaker attached to the current transformer that interrupts the unfiltered alternating current supplied from the utility when the unfiltered alternating current supplied from the utility exceeds a limit;
an 18-pulse diode rectifier connected to the utility to receive the unfiltered alternating current;
a direct current (DC) bus formed on diodes of the 18-pulse diode rectifier;
an inverter connected to the direct current bus;
a clean alternating current bus attached to an output of the inverter;
an alternating current to direct current converter connected to the clean alternating current bus; and
a battery connected to an output of the alternating current to direct current converter that charges the battery.

2. The back up power supply of claim 1, wherein the inverter creates a constant voltage and frequency output regardless of variations in the unfiltered alternating current supplied from the utility.

3. The back up power supply of claim 1, wherein, depending on required ride through time of devices connected to the back up power supply, batteries and capacitors are connected to the DC bus.

4. The back up power supply of claim 1, further comprising a DC link connected between the battery and a DC-DC converter, wherein the battery utilizes the DC-DC converter to match battery voltage to a DC link voltage supplying backup power to the inverter.

5. A method for supplying back up power, the method comprising:
    providing an unfiltered alternating current supplied from a utility to a 18-pulse diode rectifier;
    providing a current transformer connected to receive the unfiltered alternating current supplied from the utility;
    providing a protection and monitoring circuit attached to the current transformer that indicates power is present;
    providing a medium voltage disconnect positioned between the utility and the current transformer;
    a circuit breaker attached to the current transformer that interrupts the unfiltered alternating current supplied from the utility when the unfiltered alternating current supplied from the utility exceeds a limit;
    providing a fused disconnect attached to an output of the protection and monitoring circuit;
    providing a live line indicator attached to an output of the fused disconnect;
    providing a direct current (DC) bus formed on a diode output of the 18-pulse diode rectifier to an inverter connected to the direct current bus;
    providing a clean alternating current bus attached to an output of the inverter to an alternating current to direct current converter; and
    providing a direct current from the alternating current to direct current converter to a battery connected to an output of the alternating current to direct current converter wherein the alternating current to direct current converter charges the battery, wherein the battery acts as a backup power supply to the inverter.

6. The method of claim 5, wherein the inverter creates a constant voltage and frequency output regardless of variations in the unfiltered alternating current supplied from the utility.

7. The method of claim 5, wherein depending on required ride through time of devices connected to the back up power supply, batteries and/or capacitors are connected to the direct current bus.

8. The method of claim 5, further comprising a DC link connected between the battery and a DC-DC converter, wherein the battery utilizes the DC-DC converter in order to match battery voltage to a DC link voltage.

* * * * *